US011226906B2

(12) United States Patent
Timbert et al.

(10) Patent No.: US 11,226,906 B2
(45) Date of Patent: Jan. 18, 2022

(54) DEVICES AND METHODS FOR SECURED PROCESSORS

(71) Applicant: SECURE-IC SAS, Cesson-Sévigné (FR)

(72) Inventors: Michaël Timbert, Saint-Fargeau-Ponthierry (FR); Sylvain Guilley, Paris (FR); Adrien Facon, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 120 days.

(21) Appl. No.: 16/139,282

(22) Filed: Sep. 24, 2018

(65) Prior Publication Data
US 2019/0095355 A1 Mar. 28, 2019

(30) Foreign Application Priority Data
Sep. 26, 2017 (EP) ..................................... 17306273

(51) Int. Cl.
*G06F 12/14* (2006.01)
*G06F 21/72* (2013.01)
(Continued)

(52) U.S. Cl.
CPC ........ *G06F 12/1408* (2013.01); *G06F 12/084* (2013.01); *G06F 21/602* (2013.01);
(Continued)

(58) Field of Classification Search
CPC .... G06F 12/1408; G06F 21/79; G06F 12/084; G06F 21/602; G06F 21/72; G06F 21/75;
(Continued)

(56) References Cited

U.S. PATENT DOCUMENTS 7,412,468 B2 * 8/2008 Butler ................... H04L 9/0662
708/250
7,657,756 B2 * 2/2010 Hall .................... G06F 12/0875
713/189

(Continued)

OTHER PUBLICATIONS

J. Woodruff et al., 'The CHERI Capability model: Revisiting RISC in an age of risk', In the Proceedings of the 41st Annual International Symposium on Computer Architecture, pp. 457-468, USA, 2014.

(Continued)

*Primary Examiner* — Joseph P Hirl
*Assistant Examiner* — Thomas A Gyorfi
(74) *Attorney, Agent, or Firm* — Meagher Emanuel Laks Goldberg & Liao, LLP (57) ABSTRACT

Embodiments of the invention provide a computing device comprising one or more processors, each processor comprising one or more processing unit, said one or more processing units being configured to execute at least one program, each program comprising data and/or instructions, the computing device further comprising, for at least some of the processors, a processor cache associated with each processor,
the processor cache being configured to access data and/or instructions comprised in the programs executed by the processor, the computing device comprising:
an auxiliary cache configured to access metadata associated with the data and/or instructions comprised in said programs;
a security verification unit configured to retrieve, from the auxiliary cache, at least a part of the metadata associated with data and/or instructions corresponding to a memory access request sent by a processor (11) to the processor cache (117).

11 Claims, 2 Drawing Sheets

(51) Int. Cl.
*G06F 21/75* (2013.01)
*G06F 21/60* (2013.01)
*G06F 12/084* (2016.01)
*G06F 21/79* (2013.01)

(52) U.S. Cl.
CPC .............. *G06F 21/72* (2013.01); *G06F 21/75* (2013.01); *G06F 21/79* (2013.01); *G06F 2212/403* (2013.01); *G06F 2212/466* (2013.01)

(58) Field of Classification Search
CPC ......... G06F 2212/403; G06F 2212/466; G06F 15/781; G06F 21/12; G06F 21/125
See application file for complete search history.

(56) References Cited

U.S. PATENT DOCUMENTS

| | | | | |
|---|---|---|---|---|
| 7,734,932 | B2* | 6/2010 | Buer | G06F 21/72 |
| | | | | 713/193 |
| 7,865,733 | B2* | 1/2011 | Goto | G06F 12/1027 |
| | | | | 713/176 |
| 9,268,652 | B1* | 2/2016 | Salyers | G06F 12/08 |
| 2006/0080553 | A1 | 4/2006 | Hall | |
| 2008/0040551 | A1* | 2/2008 | Gray | G06F 12/084 |
| | | | | 711/130 |
| 2011/0296204 | A1* | 12/2011 | Henry | G06F 21/52 |
| | | | | 713/190 |
| 2012/0096282 | A1* | 4/2012 | Henry | G06F 9/30189 |
| | | | | 713/190 |
| 2013/0067245 | A1* | 3/2013 | Horovitz | G06F 12/128 |
| | | | | 713/193 |
| 2014/0317419 | A1* | 10/2014 | Cooke | G06F 21/85 |
| | | | | 713/193 |
| 2017/0091107 | A1* | 3/2017 | Peterson | G06F 12/123 |
| 2017/0177367 | A1* | 6/2017 | DeHon | G06F 12/0875 |
| 2019/0004974 | A1* | 1/2019 | Chhabra | G06F 12/0875 |

OTHER PUBLICATIONS

European Search Report for 17306273.8 dated Feb. 2, 2018.
Alex Ross Grieve: "A recompilation and instrumentation-free monitoring architecture for detecting heap memory errors and exploits", Dec. 1, 2016 (Dec. 1, 2016). Graduate Theses and Dissertations, 15921, Retrieved from the Internet: URL:https://lib.dr.iastate.edujcgijviewcon tent.cgi?article=6928&context=etd [retrieved on Jan. 23, 2018].
Arthur Azevedo De Amorim et al: "Micro-Policies: Formally Verified, Tag-Based Security Monitors", 2015 IEEE Symposium on Security and Privacy, May 18, 2015 (May 18, 2015). pp. 813-830.
Watson Robert N M et al: "CHERI: A Hybrid 1-14 Capability-System Architecture for Scalable Software Compartmentalization", 2014 IEEE Symposium on Security and Privacy, IEEE, May 17, 2015 (May 17, 2015). pp. 20-37.

* cited by examiner

DEVICES AND METHODS FOR SECURED PROCESSORS

TECHNICAL FIELD

The invention generally relates to digital data processing and in particular to the field of secured processors.

BACKGROUND

A computing device (also referred to as computer or computing machine) carries out an arbitrary set or sequences of arithmetic or logical operations, called programs.

A computing device generally comprises of at least one processing element, typically a central processing unit (CPU), and some associated form of memory. The fundamental operation of a processing element, regardless of the physical form it takes, is to execute the instructions of a program by performing arithmetic, logical, control, and input/output operations specified by the instructions.

The program to be executed consists in data and instructions that are stored in memorie(s). Any program implementation is transcribed into a low-level machine language in order to be processed by a hardware device. Data and instructions are moved from different memories via buses before being processed by the processing elements. During the compilation process, data is associated to operands and instructions are associated to operators.

Modern computing devices use fast computing units processing at the nano-second time scale. This makes it possible, for a given program, to perform hundreds of millions of operations in less than a second. Therefore, memory units must be fast enough to provide such bandwidth to the processing elements and avoid bottlenecks. More importantly, as memory units store personal and sensitive data (for example cryptographic keys in secure computing devices such as secure embedded systems), it is necessary to enforce the security of moved data and/or instructions and ensure a good and correct execution of programs by the processing elements.

Computing devices are prone cyber attacks that target the behavior when executing a software code/program on a processor and are built on exploiting the machine-code execution by the processing elements to access and gain control of victim hosts. In particular, memory-based attacks on hardware/software designs rely on corrupting memory addresses (locations) to hijack control flow. For example, arbitrary program execution can be achieved by corrupting a code/program memory location (as example the return address).

Some solutions to ensure protection and/or security against cyber attacks in general and memory-based attacks in particular, exist.

Existing software protection policies comprise:
antivirus programs used to detect/identify the presence of malware codes;
the use of canaries to detect overflows;
dynamic information flow tracking to identify and track the unsafe data;
the use of virtual memory addresses rather than physical addresses in combination with the deployment of non-executable stack and heaps, address space layout randomization, and stack canaries. Such protection measures provide memory access restrictions and prevent from code injection and/or execution by attackers, and control flow integrity based on the detection of any modifications on the flow control.

Memory security policies can be enforced using tagged hardware architectures. Attacks which hijack control flow can be prevented by using tagged memory protections to restrict writes/reads to memory locations. Tagged memories associate metadata with each memory location and can be used to implement fine-grained memory access restrictions. Tagged architectures can implement a tag of physical memories but not virtual memories to maintain a single table for the entire computing device.

A tagged architecture is a hardware architecture where each memory word/block is divided into a "data" section and a "tag" section. The data section is sufficiently large to contain a memory address and the tag section contains metadata associated with the data stored in the data section, the tag section is used to describe how the data section is to be interpreted (that is, how it encodes the type of the data). Accordingly, tagged architectures greatly simplify the implementation of a memory manager because each word of memory is self-describing/self-identifying. Recent works on memory tagged architectures can be found in "J. Woodruff et al., 'The CHERI Capability model: Revisiting RISC in an age of risk', In the Proceedings of the $41^{st}$ Annual International Symposium on Computer Architecture, pages 457-468, USA, 2014".

Existing software protections enable a partial protection of computing devices and provide in general a limited software analysis (for example by protecting sensitive data partially, and providing no runtime protection) and are in general demanding in terms of memory and processing resources. Hardware protections are costly, with limited evolution capabilities and generally require modifications of the processor architecture.

There is accordingly a need for methods and systems for securing computing devices against cyber attacks, in particular against memory-based attacks.

SUMMARY

In order to address these and other problems, there is provided a computing device comprising one or more processors, each processor comprising one or more processing unit. The one or more processing units are configured to execute at least one program, each program comprising data and/or instructions. The computing device further comprises, for at least some of the processors, a processor cache associated with each processor, the processor cache being configured to access data and/or instructions comprised in the programs executed by the processor. The computing device comprises:
an auxiliary cache configured to access metadata associated with the data and/or instructions comprised in the programs;
a security verification unit configured to retrieve, from the auxiliary cache, at least a part of the metadata associated with data and/or instructions corresponding to a memory access request sent by a processor to the processor cache.

According to some embodiments, the processor cache and the auxiliary cache may be implemented on different hardware entities.

In some embodiments, the auxiliary cache may be comprised in the security verification unit.

According to some embodiments, the processor cache and the auxiliary cache may be implemented on a same hardware entity.

According to some embodiments, the computing device may comprise memory means, the auxiliary cache being configured to retrieve the metadata from a metadata memory comprised in said memory means.

According to some embodiments, each security verification unit may be associated with a single processor.

In other embodiments, each security verification unit may be associated with one or more processors.

According to some embodiments, the metadata memory, the auxiliary cache, and the security verification unit may be implemented on a same hardware entity.

According to some embodiments, the computing device may comprise a security verification unit configured to retrieve metadata continuously in time or at predefined time intervals.

According to some embodiments, a memory access request may correspond to a request for accessing data and/or instructions. In such embodiments, the computing device may comprise a security verification unit configured to retrieve metadata depending on the volume of the requested data and/or instructions.

In some embodiments, a security verification unit may be further configured to verify the correct execution of the programs being executed by one or more processors and/or perform one or more control actions on one or more processors depending on the retrieved metadata.

According to some embodiments, at least one processor may be a secure crypto-processor configured to execute one or more cryptographic operations.

In some embodiments, at least some of the data and/or instructions and/or metadata may be encrypted using one or more encryption mechanisms implementing one or more of error correction codes, hash functions, secret key-based cryptographic algorithms.

There is also provided a method for executing programs, each program comprising data and/or instructions, the method comprising storing the data and/or instructions comprised in the executed programs being executed and the metadata associated with said data and/or instructions. The method comprises the steps of:

- accessing metadata associated with the data and/or instructions comprised in the programs; and
- retrieving, in response to a memory access request for data and/or instructions, at least a part of the metadata associated with the data and/or instructions of the programs being executed.

Advantageously, the various embodiments of the invention provide a non-intrusive solution for securing processors which does not require any modification of the central processing unit core(s) and enables a protection against both cyber and physical attacks.

Advantageously, the various embodiments of the invention provide efficient hardware implementations offering a fine-grained control flow integrity verification and a complete code integrity protection against code modification and corruption induced for example by fault or row-hammer-like attacks. Moreover, the provided implementations are flexible and can be adapted to various required levels of security.

The use of cache memorie(s) for metadata retrieval according to the various embodiments of the invention enables advantageously speeding-up metadata fetching during code execution.

Further advantages of the present invention will become clear to the skilled person upon examination of the drawings and the detailed description, provided for illustration purposes only.

BRIEF DESCRIPTION OF THE DRAWINGS

The accompanying drawings, which are incorporated in and constitute a part of this specification, illustrate various embodiments of the invention, together with the general description of the invention given above and the detailed description of the embodiments given below.

DETAILED DESCRIPTION

Embodiments of the present invention provide devices and methods for securing processors implemented in computing devices.

Secured computing devices, methods, and computer program products according to the various embodiments of the invention may be implemented in a wide variety of industrial, information and consumer devices and systems used in numerous applications.

Figure 1:
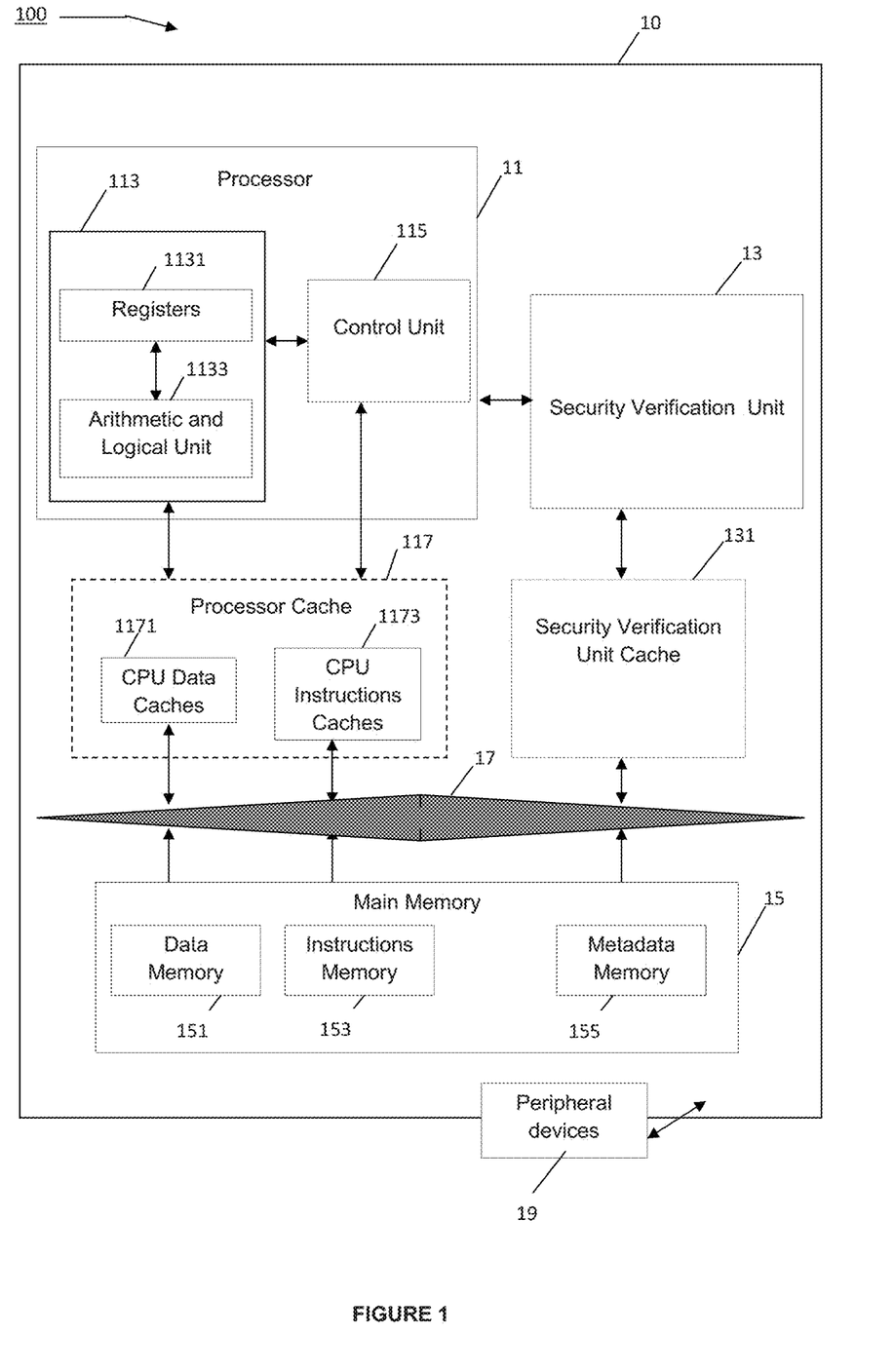
FIG. 1 is a block diagram illustrating the structure of a secured computing device, according to some embodiments of the invention.

With reference to FIG. 1, an example of the implementation of a secured computing device 10 in a system 100 is shown.

Computing devices 10 may be used in various application fields comprising, without limitations, digital electronics, communications (e.g. digital, wired, wireless, cellular, optical, satellite, acoustic, and molecular communications), computing networks/systems, data center interconnections, digital data storage, recording (e.g. magnetic and optical recording), data and information processing (e.g. databases, online sale systems, financial systems), positioning systems, digital television and video broadcasting, identity (e.g. electronic passport systems, banking), etc.

The system 100 may be for example any information system, data storage and/or processing system, computing system, and/or communication system.

The computing device 10 may be any device, computer, computing machine, or embedded system, programmed and/or programmable to execute programs (also referred to as 'computer programs'). Exemplary computing devices 10 comprise, without limitations, electrical and digital electronic devices, computers (e.g. desktop computers and laptops), tablets, routers, switches, printers, mobile phones, base stations, relay stations, satellites, Internet Of Thing (IoT) devices, robots, drones, smartcards, Automated Teller Machines (ATM), recorders, microwave ovens, etc.

In an application of the invention to communication systems, the computing device 10 may be fixed or mobile, configured to operate in a wired, wireless, or optical fiber-based communication network.

Further, the computing device 10 may be a standalone device or may be connected to external devices, machines or systems for example in computer networking systems (e.g. small or large area wired or wireless access networks).

According to some embodiments, the computing device 10 may be a cryptographic device configured to implement cryptographic mechanisms for ensuring data or signals security, authentication, protection, and/or privacy.

Regardless of the application and the type of the computing device 10, the main task of the computing device 10 may be to carry out, by one or more processors, computer programs stored in memory means (also referred to as memory storage), for example non-volatile memories, Random Access Memories (RAM), flash memories, mass storage such as hard disks, etc.

As used herein, a computer program refers to a collection of instructions (such as add, move data, and branch) that performs a specific task when executed by a processor. The format and semantics of the instructions are defined by the ISA (instruction set architecture).

A part or all of a computer program that performs a well-defined task is known as an algorithm. A collection of computer programs, libraries, and related data are referred to as software. Computer programs may be categorized along functional lines, such as application software or system software.

A computer program is usually written by a computer programmer in a programming language, directly or via dedicated tools. From the program, in its human-readable form of source code, a compiler can derive machine code (a form consisting of instructions) that the computing device can directly execute. Alternatively, a computer program may be executed with the aid of an interpreter.

The basic operational process performed by a processor to execute an instruction is known as an 'instruction cycle' (also called a 'fetch-decode-execute cycle'). This process defines the way according to which a processor retrieves an instruction from memory means, and/or determines the actions dictated by the instruction, and/or carries out those actions.

The computing device 10 may have different cycles based on different instruction sets. Basically, an instruction cycle may consist of three steps as follows:
1. Fetch the instruction: the instruction is fetched from memory means;
2. Decode the instruction: the fetched instruction is interpreted/decoded;
3. Execute the instruction: the actions required by the instruction are performed.

Memory means are configured to store programs, as well as data. Thus, programs and data may transit from memory means to processor(s) where they can be executed. A computer program may use memory addresses to execute machine code, store and retrieve data in/from memory means. A memory access request may correspond to an instruction request or to a data request.

As shown in FIG. 1, the computing device 10 may comprise at least one processor 11 (also referred to as 'central processing unit (CPU)') and memory means 15 (also referred to hereinafter as 'main memory'), the processor 11 being configured to execute the computer programs stored in the memory means 15 using one or more processing units 113 (also referred to as 'cores'). The computing device 10 may comprise memory bus(es) 17, configured to route directly or indirectly (for example via cache memories) data and/or instructions and/or memory addresses between the memory means 15 and the processor 11.

In some embodiments, the processor 11 may be configured to execute the instruction cycles sequentially, i.e. each instruction being processed before the next one is started.

Alternatively, in some embodiments, the processor 11 may be configured to execute the instruction cycles concurrently or in parallel, the instruction cycles being for example scheduled using an instruction pipeline.

According to some embodiments, the memory means 15 may comprise:
a data memory 151 configured to store data;
an instructions memory 153 configured to store the instructions of computer programs, and
a metadata memory 155 configured to store metadata associated with each memory location (corresponding to data or instructions memory locations). More specifically, the metadata memory 155 may be configured to store metadata associated with each of the memory locations of data and instructions stored respectively in the data memory 151 and the instructions memory 153).

According to some embodiments, the metadata memory 155 may be physically independent from the data memory 151 and the instructions memory 153, the metadata memory 155 being then inaccessible, directly or indirectly (for example via cache memories) by the processor 11.

In order to speed up processing of programs and reduce the average cost (time or energy) to access data from the memory means 15, smaller and faster cache memories may be used.

Accordingly, the computing device 10 may comprise a processor cache 117 accessible by the processor 11, closer to the processor core 113, the processor cache 117 being configured to access the data and/or instructions comprised in the programs to be executed by the processor 11. The processor cache 117 may store copies of the data and/or instructions from frequently requested locations in the memory means 15 so that they are immediately available to the processor(s) 11 when needed. In particular, the data stored in the processor cache 117 may be the result of earlier computations, or the duplicate of data stored elsewhere (for example in memory means 15).

In some embodiments, the processor cache 117, and consequently the processor 11, may access data and/or instructions stored in memory means 15 but may not access the metadata associated with the accessible data and/or instructions. Referring to FIG. 1, the processor cache 117 (thus the processor 11) may be configured to access the data memory 151 and the instructions memory 153 but not to access the metadata memory 155.

Embodiments of the invention may provide devices and methods for controlling/monitoring/securing the program execution by the processor(s) 11.

More specifically, embodiments of the invention may provide devices and methods for controlling the data and/or instructions moved (respectively fetched) to (respectively by) the processor(s) 11 in response to a memory access request delivered by the processor 11. A memory access request corresponds to data request and/or instruction(s) request.

According to some embodiments of the invention, the monitoring of the access of the processor 11 to data and/or instructions may be performed by controlling the metadata associated with the data and/or instructions requested by the processor 11.

In some embodiments, the computing device 10 may comprise:
memory means 131 (also referred to as 'auxiliary cache' or 'security verification unit cache') configured to access metadata associated with the data and/or instructions comprised in the programs executed by one or more processing units 113 of one or more processors 11, and
a security verification unit 13 configured to retrieve, from the auxiliary cache 131 and in response to a memory access request sent by at least one processor 11 to a processor cache 117; at least a part of the metadata associated with the data and/or instructions corresponding to the requested memory access.

In one embodiment, the processor 11 and the security verification unit 13 may be designed (or arranged) as parts of a same manufactured product. Accordingly, the security verification unit 13 may be connected or connectible to the processor 11 as an additional or external hardware. The connection between the security verification unit 13 and the processor 11 may be reversible or irreversible; accordingly, the security verification unit 13 and/or the memory means 131 may be automatically destroyed in case of attempt to separate it from the processor 11.

According to some embodiments, the computing device 10 may be a multi-processor, comprising at least two processors 11.

In some embodiments, the processor 11 may be a single core processor, comprising a single processing unit 113.

In other embodiments, the processor 11 may be a multi-core processor, comprising a plurality of processing units 113 configured to perform tasks at a given time (as used for example in embedded systems, digital signal processing, or graphic processing units). The tasks may be software processes or/and threads scheduled by the operating system.

In such embodiments, the processor 11 may be a single computing component configured to run multiple instructions on separate cores at the same time, increasing overall speed for program execution amenable to parallel computing. The different cores 113 may be integrated onto a single integrated circuit die (also known as a chip multiprocessor), or onto multiple dies in a single chip package.

Further, cores 113 in a multi-core processor 11 may or may not share memory means (for instance cache memories). In some embodiments, the cores 113 may be configured to implement message passing or shared-memory inter-core communication methods.

In embodiments in which the computing device 10 is a multi-processor, the computing device 10 may comprise one or more single-core processors and one or more multi-core processors.

Further, in some embodiments in which the computing device 10 comprises a plurality of processors 11, the processors 11 may be centralized in space or distributed in space such as clusters and farms of servers.

According to some embodiments, the memory means 131 may be configured to previously store at least a part of the metadata associated with the memory location requested by the processor 11. Alternatively, memory means 131 may retrieve the required metadata from the metadata memory 155 of the memory means 15 (for instance from main memory). More specifically, the memory means 131 may be configured to fetch the required metadata in parallel of the program execution and serve the retrieved metadata to the securing verification unit 13.

In some embodiments, the memory means 131 and the processor cache 117 may be implemented on a same hardware entity.

In one embodiment, the memory means 131 may be cache memories (also referred to as 'security verification unit cache(s)') physically independent of the processor cache 117. In other words, the processor cache 117 and the security verification unit cache 131 may be implemented separately on the chip.

In particular embodiments, the memory means 131 may be implemented within the security verification unit 13.

According to some embodiments in which the computing device 10 comprises a plurality of processors, the computing device 10 may comprise a security verification unit 13 associated with each processor 11, i.e. the computing device 10 may comprise as many security verification units 13 as processors 11. Each security verification unit 13 may then be configured to monitor/control the execution of program instructions by a given single processor. Accordingly, each security verification unit 13 may be configured to retrieve, from at least one security verification unit cache 131, metadata associated with the data and/or instructions comprised in the programs executed by a single processor 11 (processor to which the security verification unit 13 is associated).

Alternatively, in some embodiments, a multi-processor computing device 10 may comprise a single security verification unit 13 associated with at least some of the processors. In other words, the computing device 10 may comprise two or more processors 11 and a security verification unit 13 configured to retrieve, from a security verification unit cache 131, at least a part of the metadata associated with the data/instructions executed by at least some of the two or more processors 11. In such embodiments, the security verification unit 13 may be configured to control the programs executed by the various processors 11 in parallel or by alternating between at least some of the processors 11 (for example, by periodically alternating between the processors).

In some embodiments in which the metadata memory 155 is implemented physically in a distributed way outside the memory means 15, the security verification unit 13, the memory means 131 and the metadata memory 155 may be implemented on a same hardware entity on the chip.

According to some embodiments, the security verification unit 13 may be activated to control the security of the processor 11, for example continuously or periodically or when a specific predefined event is triggered. In such embodiments, the frequency and/or the duration of the metadata retrieval performed by a security verification unit 13 may be time-triggered and/or event-triggered and/or dependent on the volume of requested data and/or instructions.

In some embodiments, the computing device 10 may comprise a security verification unit 13 configured to continuously (i.e. in response to each memory access request sent by a processor 11), or periodically (e.g. at predefined time intervals that may be for example fixed, cyclic, or random) retrieve metadata associated with data and/or instructions executed by a processor 11. In such embodiments, the clock frequency of the processor 11 may serve as a basis to determine the frequency of metadata retrieval.

In some embodiments, the computing device 10 may comprise a security verification unit 13 configured to retrieve metadata associated with data and/or instructions executed by a processor 11 depending on the volume of the requested data or instructions. For example, the security verification unit 13 may be configured to perform metadata retrieval at each request of a predefined block of memory locations (e.g. at each request of a block of instructions also referred to as a 'basic block') or upon excess of a predefined threshold of a volume of data/instructions.

In some embodiments in which the computing device 10 comprises two or more processors or two or more cores, the security verification unit 13 may be configured to retrieve metadata associated with data and/or instructions being executed by the two or more processors or the two or more cores in parallel or sequentially, for example by alternating between at least some of the two or more processors or two or more cores. The alternation may be for example performed periodically or depending on the volume of the requested data and/or instructions.

According to some embodiments, the computing device 10 may comprise a security verification unit 13 configured to retrieve metadata associated with data and/or instructions executed by a processor 11 upon memory access request(s) of specific/predefined instruction(s).

In some embodiments, the duration and/or the frequency of metadata retrieval may be configurable satisfying a required performance/security tradeoff.

In some embodiments, the metadata retrieval may be performed by a combination of at least some of the preceding features.

According to some embodiments, a security verification unit 13 may be further configured to verify the correct execution of the programs being executed by one or more processors 11 and/or perform one or more control actions on one or more processors 11 depending on the content and/or the volume of the retrieved metadata. In some embodiments, a control action may be chosen in a group comprising passive actions (such as doing nothing) and/or active actions (corrective and/or preemptive) comprising:
- triggering a security alarm upon the detection of abnormalities on the execution of the computer programs (for example upon the retrieval of predefined/specific metadata or upon the retrieval of metadata associated with predefined/specific data and/or instructions) and/or on the detection of a hardware and/or software attack on one or more processors 11;
- Stopping (permanently or temporarily), rebooting, restarting one or more parts of one or more processors 11 and/or stopping the execution of one or more instructions/programs at one or more processors 11, and
- Modifying one or more of the data and/or instructions volume thresholds used to configure the frequency of metadata retrieval in embodiments in which the metadata retrieval is dependent on the volume of the requested data and/or instructions.

According to some embodiments, the computing device 10 may comprise at least one virtual processor 11, a virtual processor being a physical central processing unit that is assigned to a virtual machine (e.g. in cloud computing applications, cloud servers, etc).

According to some embodiments, the computing device 10 may comprise a secure crypto-processor 11 dedicated for carrying out cryptographic operations to protect sensitive data in memory from hardware and/or software attacks. A crypto-processor 11 may be configured to perform cryptographic mechanisms for encryption, integrity, and replay protection. Advantageously, memory encryption enables protecting the confidentiality of memory-resident data, integrity protection enables preventing an attacker from causing hidden modifications to the encrypted data stored in memory, and replay protection enables eliminating undetected temporal substitution of the encrypted data. Exemplary crypto-processors comprise smartcards used for example in financial transactions, restricted access, telecommunication, military applications, secure communication equipments, Automated Teller machines, TV set-top boxes, etc.

According to some embodiments, memory encryption may be used to protect transferred data and/or instructions between the different storage means (for example between the memory means 15 and the processor cache 117 and/or between the processor cache 117 and the processor 11), and/or to protect the metadata associated with data and/or instructions. In such embodiments, data and/or instructions and/or metadata may be encrypted.

Memory encryption may use one or more encryption mechanisms implementing one or more of error correcting codes (for example Hamming codes, BCH codes), hash functions, and secret key-based cryptographic algorithms (using symmetric or asymmetric keys). Symmetric encryption algorithms may be chosen in a group comprising DES, 3DES, AES, and RC4.

Asymmetric encryption algorithms may be chosen in a group comprising RSA and ECDSA.

In some embodiments in which memory encryption uses one or more secret keys, the secret keys may be previously stored in the computing device 10 (in a centralized or distributed way for example in the memory means 15) or may be generated (online or offline) by a random number generator and/or by Physically Unclonable Function (PUF). In some embodiments, a random number generator may be chosen in a group comprising a pseudo-random number generator and a true random number generator.

In some embodiments, the secret key(s) may be destroyed on reboots and/or on shutdown and initialized (in a deterministic or random way) at the initialization of the processor 11.

In such embodiments, the encryption and decryption algorithms may be chosen based on trade-offs between performance, memory, and the security level required by an application and/or a defined user.

According to some embodiments, the metadata associated with data and/or instructions may indicate the statistical usage (for example the time and the frequency) of the data and/or instructions. This type of metadata may be used by the system to determine, according to the data and/or instructions migration policy, which data may be loaded by the processor cache 117 from memory means 15 and/or which metadata may be previously loaded by a security verification unit cache 131 from memory means 15, more specifically from the metadata memory 155.

In some embodiments, the metadata may comprise information needed to ensure control flow integrity verification. In particular, the stored information may depend on the required security level. For example, in embodiments in which inter and intra procedural security is required, metadata associated with each block of instructions may comprise the destination address allowed after said block of instructions.

According to some embodiments, each block of instructions may be associated with a block of metadata, the metadata associated with instructions being stored in blocks.

Advantageously, a block of metadata associated with a block of instructions may have the same size and/or may be stored in the same order as said block of instructions, enabling a fast retrieval of the metadata associated with specific blocks of instructions and a synchronization between the CPU instructions cache 1173 and the security verification unit cache 131.

According to some embodiments, the memory means 131 may be configured to access the metadata associated with each basic block (i.e. block of instructions) given the address of said basic block. More specifically, for a given basic block located at the address @BB, the memory means 131 may be configured to fetch the metadata from the location @Meta=@BB+Offset in the memory means 15 (more precisely in the metadata memory 155), with Offset denotes a given offset value. Accordingly, the knowledge of the offset value and the memory address (physical or virtual) of the blocks of instructions may be sufficient to load metadata associated with each requested memory location, the calculation of the address of metadata being an addition of the offset and the instruction address fetched by the processor 11.

In some embodiments, the given offset value may be the same for each block of instructions (for one program execution).

In some embodiments, the given offset value may be different for each program execution.

According to some embodiments, the metadata may be updated as the data and/or instruction, with which it is associated, is updated.

According to some embodiments using tagged memories, the metadata associated with data may comprise the tag bits used to define/describe/determine the type of said data.

According to some embodiments, the memory means 15 may correspond to the main memory of the computing device 10.

According to some embodiments, the memory means 15 may be chosen in a group comprising volatile memories, non-volatile memories, a combination of both volatile and non-volatile memory units.

In some embodiments, a volatile memory may use one or more of a RAM, DRAM (e.g., DDR, SDRAM) SRAM, T-RAM, and Z-RAM. Volatile memories are generally advantageous in terms of improving read/write performance, with a lower cost/footprint than non-volatile writable memories.

In some embodiments, a non-volatile memory may use one or more of a Mask ROM, PROM, EPROM, EEPROM, NVRAM, Flash memory Solid-state storage, nvSRAM, FeRAM (Ferro-electric RAM), MRAM (Magnetic RAM), PRAM. Non-volatile memories are generally advantageous in terms of providing access to previously stored information upon reboot and/or power cycle.

According to some embodiments, the memory locations may correspond to physical addresses.

In some embodiments, the memory locations may correspond to virtual/logical addresses, the computer programs having no knowledge of the physical addresses. In such embodiments, the computing device 10 may comprise a memory management unit (not shown in FIG. 1) configured to store all memory references used for virtual memory management. The memory management unit may be configured to perform the translation of virtual memory addresses to physical addresses. The memory management unit may be configured to handle at the same time memory protection, cache controls, and bus arbitration. Further, the memory management unit may be implemented as part of the processor 11 or as separate integrated circuit outside the processor 11.

The processor cache 117 may be configured to load data from memory means 15, depending on a data migration policy defined at the computing system level. The data migration policy may be set such that data migration overheads (such as bandwidth, energy, computing processing, and combinations thereof) are reduced. Accordingly, the amount of data may be previously customized to meet the needs of the processor, application, or combinations thereof.

According to some embodiments, data may be stocked in memory in blocks of fixed sizes. Accordingly, memory means 15 and cache memories (for example the processor cache 117) may be divided into pages/lines/blocks of a same length/size. Alternatively, memory means 15 and caches memories may be divided into blocks having different sizes.

According to some embodiments, the processor cache 117 may be configured to retrieve/send data from/to the memory means 15, in blocks of cache lines (also known as cache blocks). When a cache line is copied from memory means 15 into the processor cache 117, a cache entry is created. The cache entry will include the copied data as well as the requested memory location.

When the processor 11 needs to read or write a location in memory means 15 (for instance in main memory), the processor may first check for a corresponding entry in the processor cache 117. The processor cache 117 may check for the contents of the requested memory location in any cache lines that might contain that address. If the processor 11 finds that the memory location is in the processor cache 117, a cache hit has occurred. However, if the processor does not find the memory location in the cache 117, a cache miss has occurred. In the case of a cache hit, the processor 11 may immediately read or write the data in the cache line. For a cache miss, the processor cache 117 may allocate a new entry and copy data from memory means 15, and then the request is achieved from the contents of the processor cache 117.

According to some embodiments, the processor cache 117 may comprise different independent caches, including data cache(s) 1171 and/or instruction cache(s) 1171.

In some embodiments, the processor cache 117 may be organized as a hierarchy of cache levels.

According to some embodiments, the processor cache 117 may be located inside the processor 11 chip (internal cache).

In other embodiments depicted in FIG. 1, the processor cache 117 may be located outside the processor 11 chip (external cache).

Further, according to some embodiments, tagged cache memories may be used. Accordingly, a cache line stored in a processor cache 117 may be divided into a data section containing data fetched from memory means 15 and a tag section which may comprise the address of the actual data fetched from memory means 15. Cache tagging may use physical addresses or virtual addresses.

As shown in FIG. 1, in some embodiments, the processor 11 may comprise:
- a processing unit 113 configured to execute the program instruction(s); the processing unit 113 may comprise an arithmetic and logical unit 1133 (ALU) configured to perform arithmetic and logical operations and processor registers 1131 configured to supply operands to the ALU 1133 and store the results of ALU operations, and
- a control unit 115 configured to decode the program instructions and orchestrate/coordinate the fetching (from memory means or storage devices) and execution of instructions by directing the coordinated operations of the ALU 1133, registers 1131 and other components of the computing device 10 (for example peripheral devices 19).

The processor registers 1131 may form small and very fast memory means (as opposed to the slower RAM main memory) used to speed the execution of the programs by providing quick access to commonly used values. The processor registers 1131 may in particular comprise specific internal registers-registers, not accessible by instructions and used internally for processor operations only, including:
- a program counter, also known as "instruction register" (not shown in FIG. 1): a program counter may indicate the position of the processor 11 in its instruction sequence. A program counter may be configured to hold either the address of the instruction being executed or the address of the next instruction to be executed, depending on the specific system;
- memory address register(s) (not shown in FIG. 1) configured to store the memory address from which data will be fetched to the processor 11 (i.e. the memory location of the data to be loaded from memory means to the processor 11) or the address to which data will be sent for storage (i.e. the memory location in which data will be stored), and memory data register(s) (not shown in FIG. 1) configured to store data fetched/retrieved from memory means (retrieved from the processor cache 117 or from memory means 15) and ready to be processed or data waiting to be stored in other memory means (for example in main memory 15).

The memory address register(s) and the memory data register(s) may be related to the fetching of information from other memory means (for example from main memory 15). When reading from memory means, the requested data whose memory address is indicated by the memory address register(s) may be fed into the memory data register(s) and then used by the processor 11. When writing to memory, the processor 11 may write data from the memory data register to the memory location whose address is stored in the memory address register.

According to some embodiments, the memory bus(es) 17 may be configured to route the metadata between the memory means 15 and the memory means (security verification unit cache) 131.

According to some embodiments, the computing device 10 may further comprise internal and/or external peripheral devices 19 including input devices, output devices, and input/output.

Many modern devices, such as digital watches, smartphones and tablet computers, have interfaces that allow them to be used as a peripheral device by desktop computers, although they are not host-dependent in the same way as other peripheral devices.

Input devices may be configured to interact with or send data from the user to the computer. Exemplary input devices comprise keyboards, computer mice, graphic tablets, barcode readers, image scanners, microphones, webcams, game controllers, light pens, and digital cameras.

Output devices may be configured to provide output to the user from the computer. Exemplary output devices comprise computer displays, printers, projectors, computer speakers, webcams.

Input/Output devices may be configured to perform both functions. Exemplary Input/Output devices comprise touchscreens.

Embodiments of the invention also provide a method for securely executing programs carried out by one or more cores of one or more processors, a program comprising data and/or instructions. The method comprises storing independently the data and/or instructions comprised in the programs to be executed and the metadata associated with the data and/or instructions, i.e. the data and/or instructions may be stored in storage means which are independent from the storage means containing the metadata associated with that data and/or instructions.

Figure 2:
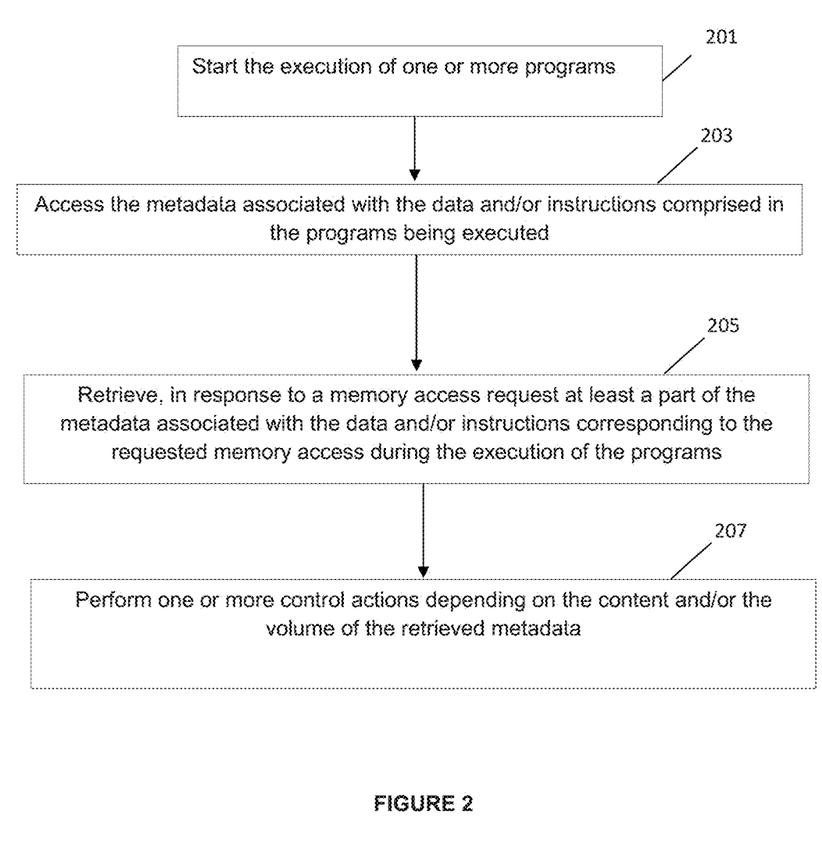
FIG. 2 is a flowchart illustrating a method of executing computer programs, according to some embodiments of the invention.

FIG. 2 is a flowchart depicting the method for secure execution of computer programs, according to some embodiments.

Step 201 may be performed to start the execution of one or more programs, the execution of a program comprising executing one or more instructions and use of data to perform the actions dictated by the instructions.

In some embodiments, the execution of the instructions comprised in the computer programs may follow the fetch-decode-execute instruction cycle. Accordingly, the execution of an instruction may comprise a step for fetching the instruction from memory/storage means, a step for decoding the instruction, and a step for executing the instruction.

In some embodiments, the instruction cycles may be performed sequentially.

In other embodiments, the instruction cycles may be performed concurrently or in parallel.

Fetching data and/or instructions may use the memory addresses which determine the locations of the data and instructions in storage means. A memory access/location request may correspond to an instruction request or to a data request.

The various embodiments of the invention provide a secure control/monitoring of the data and/or instructions comprised in the computer programs through a control of the metadata associated with the data and/or instructions requested during the execution of the computer programs.

At step 203, the metadata associated with the data and/or instructions comprised in the programs being executed may be accessed.

At step 205, in response to a memory access request, at least a part of the metadata associated with the data and/or instructions corresponding to the requested memory access during the execution of the programs may be retrieved.

According to some embodiments, the frequency and/or the duration of the metadata retrieval performed at step 205 may be time-triggered and/or event-triggered and/or dependent on the volume of the requested data and/or instructions.

In embodiments in which metadata retrieval is time-triggered, step 205 may be performed continuously (i.e. in response to each memory access request) or periodically (for example at predefined time intervals).

In embodiments in which metadata retrieval is event-triggered, step 205 may be performed in response to a memory access request corresponding to specific/predefined instruction(s).

In embodiments in which metadata retrieval is dependent on the volume of the requested data and/or instructions, step 205 may be performed at each request of a predefined block of memory locations or upon excess of a predefined threshold of a volume of data and/or instructions.

In some embodiments, the duration and/or the frequency of metadata retrieval may be configurable, satisfying a required performance/security tradeoff.

In some embodiments, the metadata retrieval may be performed by a combination of the preceding aspects.

At step 207, one or more control actions may be performed depending on the content and/or the volume of the retrieved metadata.

According to some embodiments, a control action may be chosen in a group comprising passive actions (such as doing nothing) and/or active actions (corrective and/or preemptive) comprising:

triggering a security alarm upon the detection of abnormalities on the execution of the computer programs (for example upon the retrieval of predefined/specific metadata or upon the retrieval of metadata associated with predefined/specific data and/or instructions) and/or on the detection of a hardware and/or software attacks.
   Stopping (permanently or temporarily) the execution of one or more instructions/programs, and
   Modifying one or more of the data and/or instructions volume thresholds used to configure the frequency and/or the duration of metadata retrieval in embodiments in which the metadata retrieval is dependent on the volume of the requested data and/or instructions.

According to some embodiments, memory encryption may be used to protect data and/or instructions and/or metadata stored and transferred between the different storage means.

According to some embodiments, memory encryption may use one or more encryption mechanisms implementing one or more of error correcting codes (for example Hamming codes, BCH codes), hash functions, and secret key-based cryptographic algorithms (using symmetric or asymmetric keys). Symmetric encryption algorithms may be chosen in a group comprising DES, 3DES, AES, and RC4. Asymmetric encryption algorithms may be chosen in a group comprising RSA and ECDSA.

In some embodiments, in which memory encryption uses one or more secret keys, the secret keys may be previously stored or may be generated (online or offline) using a random number generator and/or by Physically Unclonable Functions. In some embodiments, a random number generator may be chosen in a group comprising a pseudo-random number generator and a true random number generator.

In some embodiments, the encryption and decryption algorithms may be chosen based on trade-offs between performance, memory, and the security level required by a user.

According to some embodiments, the metadata associated with data and/or instructions may indicate the statistical usage (for example the time and the frequency) of the data and/or instructions.

According to some embodiments, the metadata may be updated as the data and/or instruction with which it is associated is updated.

According to some embodiments using tagged memories, the metadata associated with data may comprise the tag bits used to define/describe/determine the type of said data.

According to some embodiments, memory addresses may correspond to physical addresses.

In other embodiments, memory addresses may correspond to virtual addresses. Step 203 may accordingly comprise a step of translating virtual memory addresses to physical addresses.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such embodiments. Some of those embodiments may be advantageously combined, when appropriate. Additional advantages and modifications will readily appear to those skilled in the art. The invention in its broader aspects is therefore not limited to the specific details, representative methods, and illustrative examples shown and described.

The invention claimed is:

1. A computing device comprising one or more processors,
    each processor comprising one or more processing unit, said one or more processing units being configured to execute at least one program, each program comprising instructions, an instruction performing a task when executed by said one or more processing units, an instruction having a format, an instruction comprising one or more basic blocks representing blocks of instructions, the computing device further comprising, for at least some of the processors, a processor cache associated with each processor,
    the processor cache being configured to access instructions comprised in the computer programs to be executed by the processor, wherein the computing device comprises a main memory, said main memory comprising:
    an instruction memory configured to store the instructions of computer programs, the processor cache being configured to access instructions comprised in the instruction memory,
    a metadata memory configured to store metadata associated with instructions stored in the instruction, memory, the metadata comprising information needed to ensure control flow integrity verification, the metadata associated with instructions being stored in blocks, a block of instructions being associated with a block of metadata;
    wherein the computing device further comprises:
        an auxiliary cache configured to fetch metadata associated with instructions requested by a processor in parallel of the program execution, the auxiliary memory being physically independent from the processor caches associated with each processor;
        one or more security verification units, a verification unit being associated with each processor, a verification unit being configured to retrieve, from the auxiliary cache, at least a part of the metadata associated with instructions in response to a memory access request sent by a processor to the processor cache, during the execution of said at least one program, the memory access request corresponding to a request for accessing said instructions,
    wherein the computing device comprises one or more memory buses configured to route the instructions between the main memory and a processor, said one or more buses being further configured to route the metadata between the main memory and the auxiliary cache,
    said at least one security verification unit being configured to retrieve said metadata depending on the requested instructions, said security verification unit being configured to verify the execution of the at least one program being executed by said one or more processors and/or perform one or more control actions on said one or more processors depending on the content and/or the volume of the retrieved metadata.

2. The computing device of claim 1, wherein each security verification unit is associated with a single processor.

3. The computing device of claim 1, wherein each security verification unit is associated with two or more processors.

4. The computing device of claim 1, wherein the metadata memory, the auxiliary cache and the security verification unit are implemented on a same hardware entity.

5. The computing device of claim 1, wherein the computing device comprises a security verification unit configured to retrieve said metadata continuously in time or at predefined time intervals.

6. The computing device of claim 1, wherein at least one processor is a secure crypto-processor configured to execute one or more cryptographic operations.

7. The computing device of claim 1, wherein at least some of the instructions and/or metadata are encrypted using one or more encryption mechanisms implementing one or more of error correction codes, hash functions, secret key-based cryptographic algorithms.

8. The computing device of claim 1, wherein the processor cache and the auxiliary cache are implemented on different hardware entities.

9. The computing device of claim 1, wherein the auxiliary cache is comprised in the security verification unit.

10. The computing device of claim 1, wherein the processor cache and the auxiliary cache are implemented on a same hardware entity.

11. A method for executing at least one computing program in a computing device comprising one or more processors, a processor cache associated with each processor, and a main memory, each program comprising instructions, an instruction performing a task when executed by said one or more processors, an instruction having a format, an instruction comprising one or more basic blocks representing blocks of instructions, the instructions of computer programs being stored in an instruction memory of the main memory, the processor cache accessing instructions comprised in the instruction memory, wherein the method comprises storing metadata associated with said instructions in a metadata memory of the main memory, the metadata comprising information needed to ensure control flow integrity verification, the metadata being associated with instructions being stored in blocks, a block of instructions being associated with a block of metadata, wherein the method comprises:

retrieving, from an auxiliary cache, at least a part of the metadata associated with the instructions of the at least one program being executed, during the execution of said at least one program, in response to a memory access request sent by a processor to the processor cache, the memory access request corresponding to a request for accessing said instructions, said at least one step of retrieving at least a part of the metadata depending on the requested instructions and comprising verifying the execution of the at least one program being executed by said one or more processors and/or perform one or more control actions on said one or more processors depending on the content and/or the volume of the retrieved metadata, the auxiliary cache fetching metadata associated with instructions requested by a processor in parallel of the program execution, the auxiliary memory being physically independent from the processor caches associated with each processor, wherein the computing device uses one or more memory buses to route the instructions between the main memory and a processor, and to route the metadata between the main memory and the auxiliary cache.

* * * * *